United States Patent [19]
Jacobs et al.

[11] Patent Number: 4,679,911
[45] Date of Patent: Jul. 14, 1987

[54] OPTICAL APPARATUS USING LIQUID CRYSTALS FOR SHAPING THE SPATIAL INTENSITY OF OPTICAL BEAMS HAVING DESIGNATED WAVELENGTHS

[75] Inventors: Stephen D. Jacobs, Pittsford; Kathleen A. Cerqua, Rochester, both of N.Y.

[73] Assignee: The University of Rochester, Rochester, N.Y.

[21] Appl. No.: 718,678

[22] Filed: Apr. 1, 1985

[51] Int. Cl.$^4$ .................................................. G02F 1/13
[52] U.S. Cl. .................. 350/347 E; 350/335; 350/350 R
[58] Field of Search ................ 350/335, 347 E, 350 R

[56] References Cited

U.S. PATENT DOCUMENTS

| | | | |
|---|---|---|---|
| 4,190,330 | 2/1980 | Berreman | 350/335 X |
| 4,394,069 | 7/1983 | Kaye | 350/347 E |
| 4,408,839 | 10/1983 | Wiener-Avnear | 350/335 X |
| 4,444,469 | 4/1984 | Kaye | 350/347 E |

Primary Examiner—John K. Corbin
Assistant Examiner—Richard F. Gallivan
Attorney, Agent, or Firm—Martin LuKacher

[57] ABSTRACT

The spatial intensity profile of an optical beam of designated wavelengths, such as a laser beam, is shaped (the beam is apodized) by means of cholesteric liquid crystals of opposite chirality disposed successively along the path of the beam. The crystals have curved surfaces, which may be defined by a lens which defines the thickness of the liquid crystal fluid gap in a liquid crystal cell, so as to vary the selective reflection of the designated wavelength across the aperture of the beam. In this way, a soft aperture is provided. By using tandem cell pairs having liquid crystals of opposite chirality, but of different pitch, and with lenses of different curvature, beams of different wavelengths which are projected colinearly along the path may be individually tailored in spatial intensity profile.

16 Claims, 11 Drawing Figures

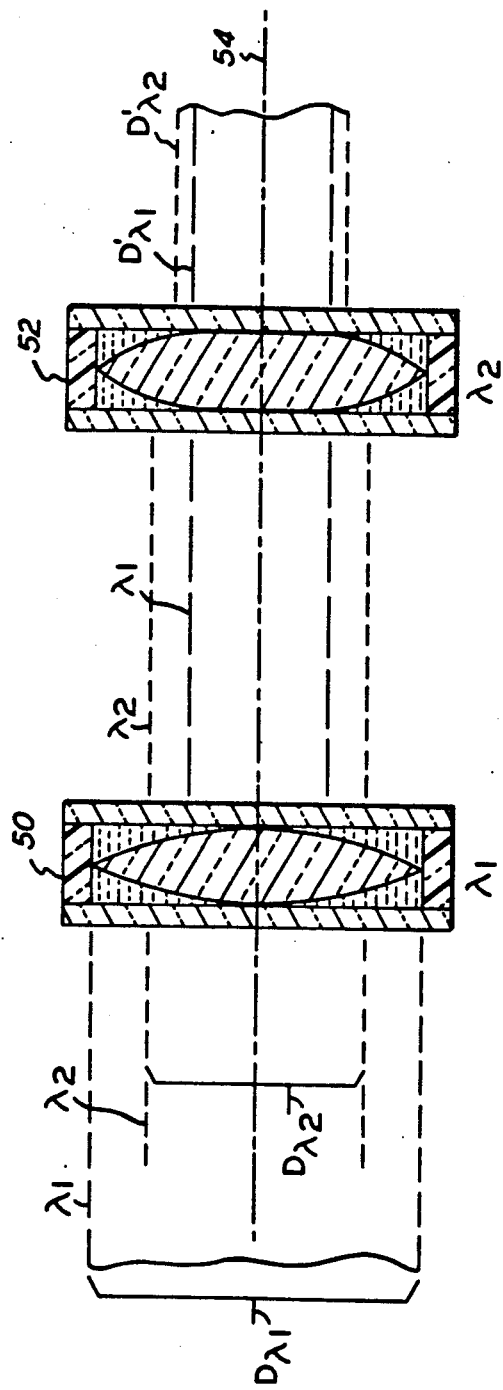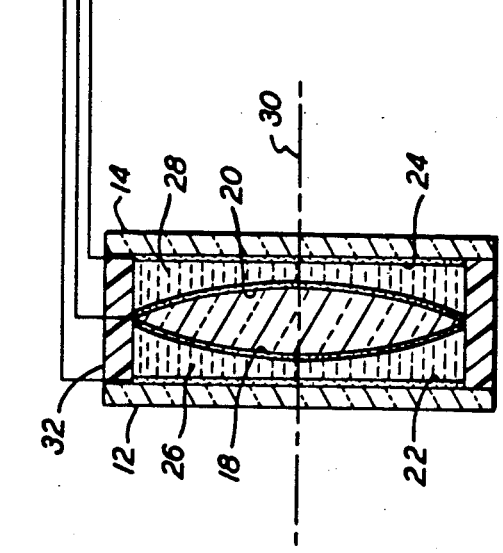
FIG. 4
FIG. 11

OPTICAL APPARATUS USING LIQUID CRYSTALS FOR SHAPING THE SPATIAL INTENSITY OF OPTICAL BEAMS HAVING DESIGNATED WAVELENGTHS

The U.S. government has rights in the invention under Cooperative Agreement No. DE-FC-080-85DP40200 between the University of Rochester and the Department of Energy.

BACKGROUND OF THE INVENTION

The present invention relates to optical apparatus, and particularly to apparatus using liquid crystals for shaping the spatial intensity profile of optical beams having designated wavelengths.

The invention is especially suitable for use in providing a soft aperture for shaping the intensity of laser beams utilizing the properties of cholesteric liquid crystals. The term "liquid crystals" as used herein includes crystals both in the solid and fluid state. The term "cholesteric" is used generically to mean liquid crystals which have chirality, whether pure cholesteric compounds or nematic materials mixed with chiral additives.

Birefringent elements have been proposed for use as soft aperture devices. They are made by the use of materials having retardance which decreases radially from the center to the edge of the device, usually by varying the thickness of the material. Birefringent crystals both solid and liquid have been used in such devices. See S. D. Jacobs, "Liquid Crystals As Large Aperture Waveplates and Circular Polarizers", SPIE 307, 98–105, 28 Aug. 1981; D. Giuliani, et al., "Radial Birefringent Element And Its Application To Laser Resonator Design", Opt. Lett. 5, 491 (1980); and J. M. Eggelston, et al., "Radial Intensity Filters Using Radial Birefringent Elements", J.O.S.A. 71, 1264 (1981). Soft apertures have also been made using variably absorbent glass. See Hudson, U.S. Pat. No. 3,465,347 issued Sept. 2, 1969.

Liquid crystal devices providing notch or blocking filters have been designed to selectively reflect laser light having a limited wavelength spectrum, but do not vary the spatial intensity of the beam to provide an apodizing effect or act as a soft aperture. See U.S. Pat. No. 3,679,290 issued July 25, 1972 and U.S. Pat. No. 3,711,181 issued Jan. 16, 1973 and the following articles, J. Adams et al., "Cholesteric Films As Optical Filters", J. App. Phys. 42(10) 4096 (1971); F. J. Kahn, "Cholesteric Liquid Crystals For Optical Applications", Appl. Phys. Lett., 18(6), 231 (1971); S. D. Jacobs et al., "Liquid Crystal Laser Blocking Filters", LLE Review 15, 30 (1983); and S. D. Jacobs, et al., "Liquid Crystal Laser Blocking Filters", presented at the Annual Meeting of the Optical Society of America, New Orleans, La., Oct. 18, 1983.

Through the use of cholesteric liquid crystals bodies in accordance with the invention, the spatial profile of designated wavelengths of optical radiation can be tailored across almost any aperture area and differently in different areas of the aperture. Oftentimes the beams to be shaped or apodized propagate along the same or closely adjacent paths, for example the beams may be colinear beams. In addition to being of different wavelengths, the beams may have different cross sections which are overlapping. The optical apparatus provided by the invention makes it possible to shape or apodize such beams of different wavelengths and cross sections without interference, i.e. the apparatus acts as a soft aperture for one of the beams without apodizing the other. The shapes of the beams can be tailored to different dimensions, again without interference and without requiring spatial beam separation. Other features and advantages of the optical apparatus for spatial intensity shaping which is provided by the invention are: Capability of shaping beams having any arbitrary input polarization; Compact size and ease of fabrication so as to shape beams regardless of their cross sectional dimension; The ability to shape beams over a wide range of desigated wavelengths, for example from 300 nanometers (nm) to 5000 nm; Capability of operating at high beam power, since shaping is accomplished through selective reflection and not absorption; High transmittance and low insertion loss for the portions of the beam which are not modified in intensity (the unapodized portions of the beam); and Minimal wavefront distortion to the transmitted beam, since the liquid crystal and the substrates which comprise the apparatus can be index matched.

SUMMARY OF THE INVENTION

Briefly described, apparatus embodying the invention for shaping the profile of an optical beam of given wavelength which is directed along a path includes first and second bodies of cholesteric liquid crystal material having opposite chirality (LH and RH) about the path and disposed successively along the path. Each of the bodies has a surface transverse to the path which is curved so that the thickness of each of the bodies along the path varies in the direction transverse to the path. The path through the liquid crystals may be negligible through the apparatus where the center of the beam passes (the optical axis). The selective reflection effect of the cholesteric liquid crystal then varies from the center to the edge of the apparatus. The transmittance through the apparatus will vary across the aperture of the beam and the spatial intensity profile of the beam at the wavelength or wavelengths over which selective reflection takes place is shaped. The beam is therefore apodized. By changing the shape of the curved surfaces of the bodies of cholesteric liquid crystal material and/or by using material having different pitch, laser beams of different wavelengths and cross sections can be apodized. Colinear laser beams and other laser beams which travel over overlapping paths can be apodized without interference through the use of successive liquid crystal devices, each with liquid crystal bodies of different pitch and with curved surfaces shaped differently in different areas of the cross section of the overlapping beams.

BRIEF DESCRIPTION OF THE DRAWING FIGURES

The foregoing and other objects, features and other advantages of the invention as well as presently preferred embodiments thereof will become more apparent from the reading of the following description in connection with the accompanying drawings in which:

FIG. 4 is a schematic diagram for apodizing colinear laser beams of different wavelength;

FIG. 11 is a view similar to FIG. 1 for apparatus in accordance with a further embodiment of the invention.

DETAILED DESCRIPTION OF THE PREFERRED EMBODIMENTS

Figure 1:
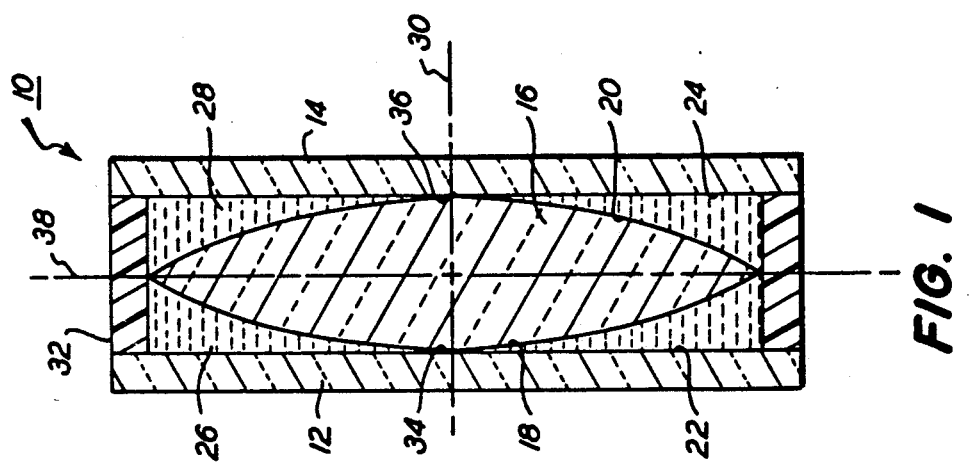
FIG. 1 is a sectional plan view through a diametral plane of liquid crystal apparatus providing a soft aperture for controling a spatial intensity profile of, and apodizing, a laser beam.

Referring to FIG. 1 there is shown a soft aperture device 10 which may be generally cylindrical in shape. The device has three substrates which are a plate 12 of transparent material, suitably glass, such as BK-7 optical glass. Another glass plate 14 similar to the plate 12 provides the other substrate and a spherical biconvex lens 16 provides the third substrate. The lens 16 has curved surfaces 18 and 20 the plates 12 and 14 have planar surfaces. The inside planar surfaces 22 and 24 of the plates 12 and 14 and the curved surfaces 18 and 20 of the lens 16 define surfaces of bodies 26 and 28 of cholesteric liquid crystal material which are transverse to the optical axis of the device (the axis 30 of the lens). The laser beam which is to be shaped (apodized) has the center of the path along which the beam propagates colinear with the axis 30.

The spacing between the substrate plates 12 and 14 is defined by a generally cylindrical spacer of plastic material, such as a polyester, plastic sleeve 32 or plastic spacer tabs with epoxy sealant filling the spaces therebetween. The chirality of the bodies 26 and 28 of liquid crystal material is equal, but opposite to each other. For example, the body 26 may have left hand, LH, chirality of pitch, P, while the body 28 has right hand, RH, chirality of pitch, P, and the bodies provide left and right hand circular polarizers. The chirality is in directions about the optical axis. The center of the surfaces 16 and 18 of the lens (the points 34 and 36 where these surfaces contact the optical axis) are also in contact with the surfaces 22 and 24 of the substrate plates 12 and 14. The path of the beam through the bodies 26 and 28 along the optical axis is negligible at that center of the device 10 and increases in a radial direction, suitably to tens of micrometers, at the outer edge of the bodies.

Selective reflection at the designated or given wavelength depends upon the pitch length and refractive index of the liquid crystal cholesteric material. Accordingly, the material is selected so as to tune the device 10 for the selected wavelength. The peak for selective reflection is determined by the average refractive index, $\bar{n}_n$ of the planes of the cholesteric structure and the pitch, P, of this structure according to the equation:

$$\lambda_0 = \bar{n}_n P \tag{1}$$

The spectral bandwidth of the selective reflection peak is governed by the equation $$\Delta\lambda_{FWHM} = (\Delta n_n / \bar{n}_n)\lambda_0 \tag{2}$$

In the equation $\Delta n_n$ is the average birefringence of either fluid 26 or 28. The bandwidth, $\Delta\lambda_{FWHM}$ is measured at the full wave half maximum points on the spectral transmission curve.

The pitch and refractive index are tuned by compound blending to satisfy equation (1), but with opposite chirality. Laser radiation of any arbitrary polarization state can be polarized and beams of any arbitrary polarization can be apodized by the device 10. Some of the pure, base nematics and chiral additives which may be used to select the pitch and refractive index are illustrated in Table 1 below.

TABLE 1

| Base Nematics and Chiral Additives | |
|---|---|
| Nematics | LH Additives |
| X—⟨O⟩—A—B—⟨O⟩—Y | COC, ZLI-811 } wax |
| X, Y        A—B | |
| | C15, CN } powder |
| Cyano-CN        Schiff-CH=N— | |
| Alkyl-CH$_3$(CH$_2$)$_n$        Azoxy-N=N(O)— | |
| Alkoxy-CH$_3$(CH$_2$)$_n$O        Ester-COO— | CH$_3$(CH$_2$)$_7$COOC$_{27}$H$_{45}$ |
| | RH Additives |
| Merck: Lieristal V. ALI1646 | CAA |
| BDH: E7, E8, . . . E44 | S1082 } solid |
| Roche: TN-403, TN701 | CE1, 2, . . . 7 |
| | CB15        fluid |

TABLE 1-continued
Base Nematics and Chiral Additives

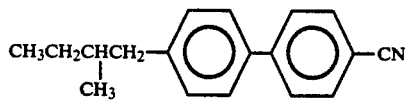

They are eutetic mixtures of long, rod-like molecules whose terminal and bridging groups are chosen to optimize properties such as melting and clearing points, viscosity, birefringence, optical transmittance and environmental stability. The base nematics listed in the table are all liquids at room temperature and pressure. The LH and RH chiral additives listed in the table may be soldis (wax or powder) or liquids. The quantity of additive required for pitch tuning depends upon the intrinsic pitch of the chiral additive substance (e.g., 150 nm for CB 15, and 800 nm for C 15). In the compound, the additive is of the order of ten to twenty weight percent (wt. %). Compound mixing is suitably performed at elevated temperatures near 70° C. to promote dissolution of the chiral additive.

The gaps between the surfaces 18 and 22 and the surfaces 20 and 24 are filled with heated compound using capillary action. Solid cholesteric liquid crystals may also be used. These may be selected from polymer systems, such as films of PBuLG (poly-γ-butyl-L-glutamate) in TGDM (triethylene glycol dimethacrylate). Further information with respect to such solid cholesteric liquid crystals may be obtained from the following articles: H. Kim, S. D. Jacobs and K. A. Cerqua, "Liquid-Crystal Laser Blocking Filters", presented at the 13th Congress of International Commission for Optics, Sapporo, Japan, Aug. 20–24, 1984; and T. Tsutsui and R. Tanaka, "Solid Cholesteric Films For Optical Applications", Polymer 21, 351 (1980).

In constructing the device 10, the substrate surfaces 18, 20, 22 and 24 are unidirectionally buffed, suitably with a one-tenth micron diamond paste to create the preferred alignment direction of the liquid crystal molecules and to provide wall anchoring for these molecules. This buffing may be accomplished by placing the plates and lens in alignment on a buffing table over which a padded soft roller, such as a paint roller, is passed. Instead of using diamond paste the surfaces may be coated with polyvinyl acetate (PVA) and then buffed with the padded roller, instead of rubbing the substrate surfaces directly with diamond paste.

After buffing, the substrates 12, 14 and 16 are heated to approximately 70 degrees centigrade and the spacers 32 are applied. The gaps are then filled with the liquid crystal cholesteric compound to form the bodies 26 and 28. The device is then cooled to room temperature and one of the substrate plates 12 is sheared with respect to the other plate 14 by approximately one-half millimeter to orient the pitch structure along the beam propagation direction (along the optical axis 30). The surfaces of the plates 12 and 14 are then adjusted for zero wedge using an interferometer. The edges around the spacer 32 are sealed with epoxy to complete the device.

Blocking extinction of the designated or given wavelength occurs when the thickness of the bodies along the direction of propagation of the beam becomes at least 10 pitch lengths at the wavelength of the beam. Accordingly, the blocking effect (which is due to selective reflection) varies radially from the optical axis 30, since the selective reflection effect builds up in proportion to the thickness of the liquid crystal bodies 26 and 28. This gives rise to a radially varying transmission profile and since blocking occurs at very small distances (note the exemplary pitch lengths for CB15 and C15 mentioned above), the lens 16 is a very soft lens of long focal length. In the exemplary devices, the characteristics of which are specified below for a designated wavelength of 1064 nm, the focal lengths vary from 1500 to 3000 mm. It will therefore be apparent why the device is called a soft aperture.

In designing the soft aperture device using a biconvex lens such as shown in FIG. 1 the lens is selected from the lens formula:

$$r = f(n-1), \qquad (3)$$

Where: f is equal to the focal length of the lens, n is the refractive index of the lens substrate and r is the radius of curvature of the lens. With r defined using equation (3) the thicknesses of the bodies 26 and 28 can be determined from the following equation:

$$t = r(1 - \cos(\sin^{-1} d/r)) \qquad (4)$$

Where: d is the radial height of the beam from the lens center (optical axis 30) and t is the thickness of the fluid bodies, which are symmetrical about the central plane 38 transverse to the optical axis 30.

Figure 6:
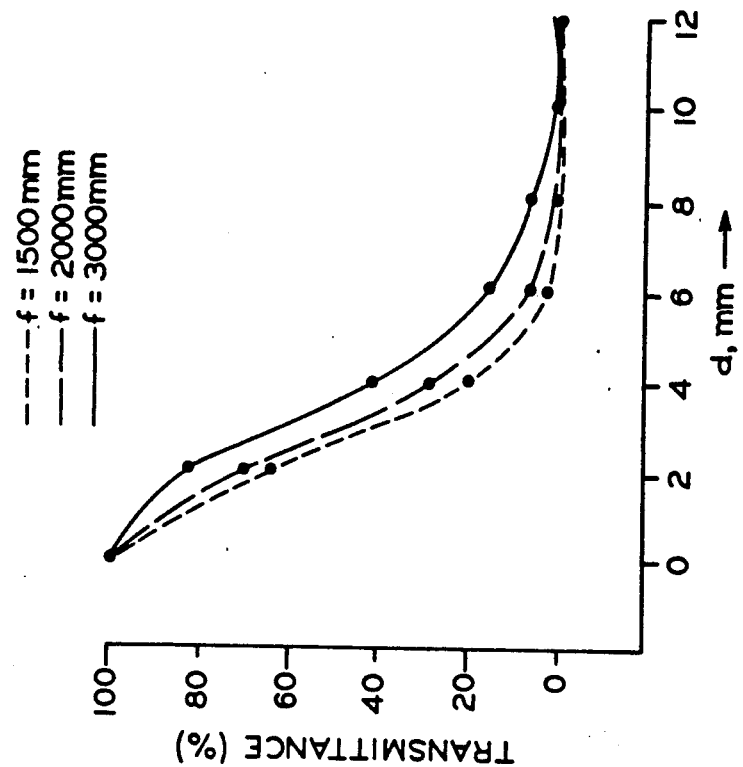
FIG. 6 is a series of curves illustrating the variation in transmittance with radial distance from the optical axis of the lens for the apparatus illustrated in FIGS. 1 & 2 for lenses of different focal length.
Figure 5:
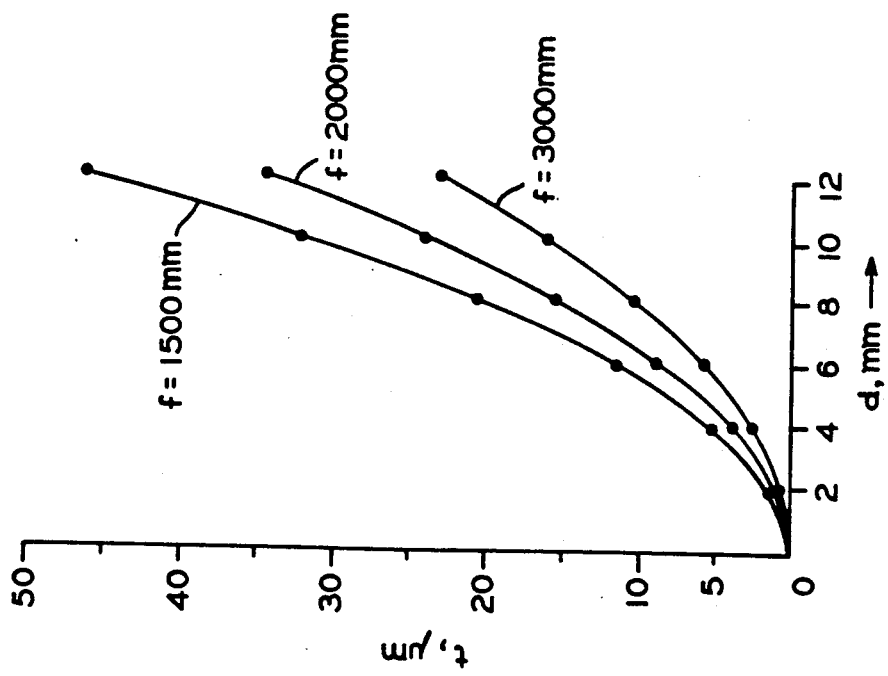
FIG. 5 is a family of curves illustrating the profile (thickness verses radial distance from the center of the lens) for apparatus of the type shown in FIGS. 1 & 2 with lenses of different focal length.

Consider the example where the wavelength of the beam is 1064 nm and the refractive index n of the lens substrate is 1.52, then the thickness, t, for lenses 16 of focal length, f, lenses of 1500, 2000 and 3000 mm is shown in FIG. 5. The spatial intensity profiles for the device 10 of FIG. 1 using each of these different focal length lenses in terms of transmittance versus radial height of the beam from the lens center (d) is plotted in FIG. 6. It will be seen that transmittance is essentially 100% where the thickness of the body approaches zero and rapidly falls to the 1% level at a radius of 7 to 8 mm. In these plots Fresnel losses are neglected.

Figure 7:
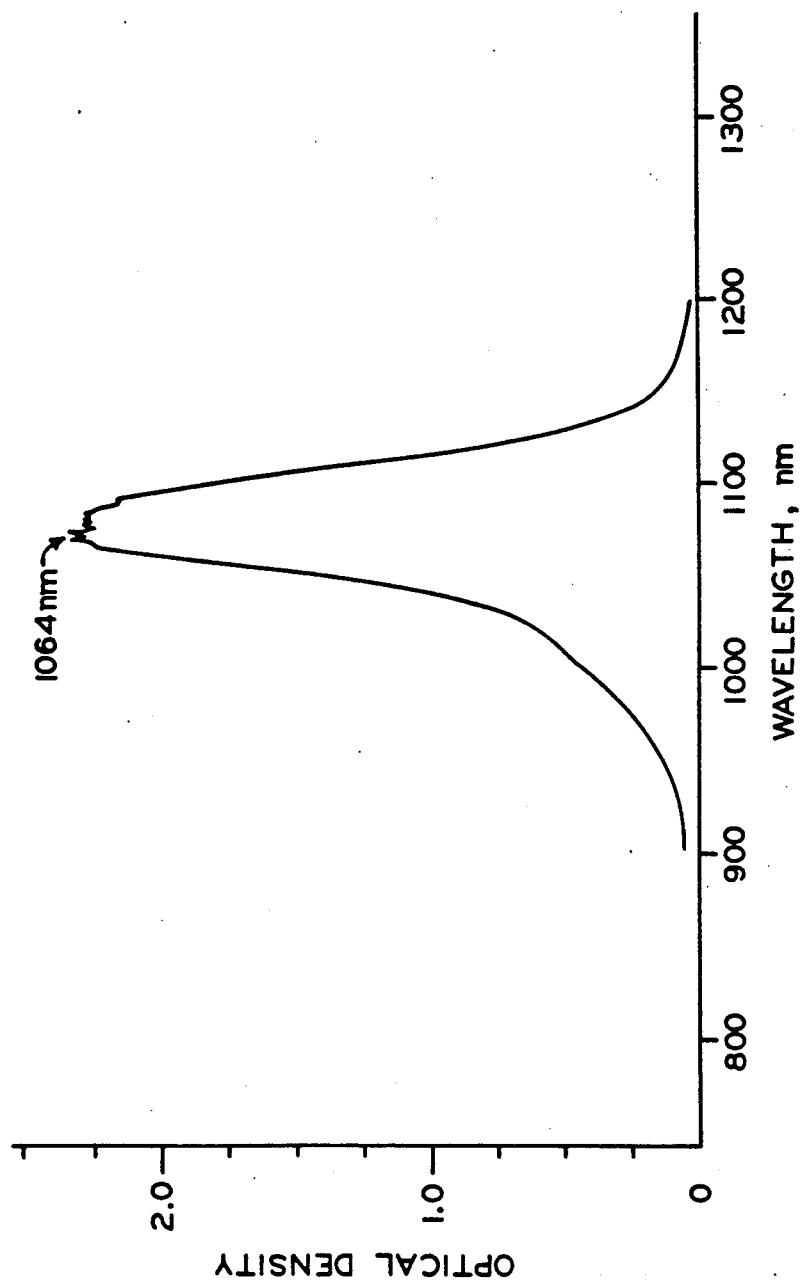
FIG. 7 is a curve illustrating the optical density of radiation transmitted through the apparatus illustrated in FIGS. 1 & 2 as a function of wavelength, when the apparatus is tuned for 1064 nm.
Figure 8:
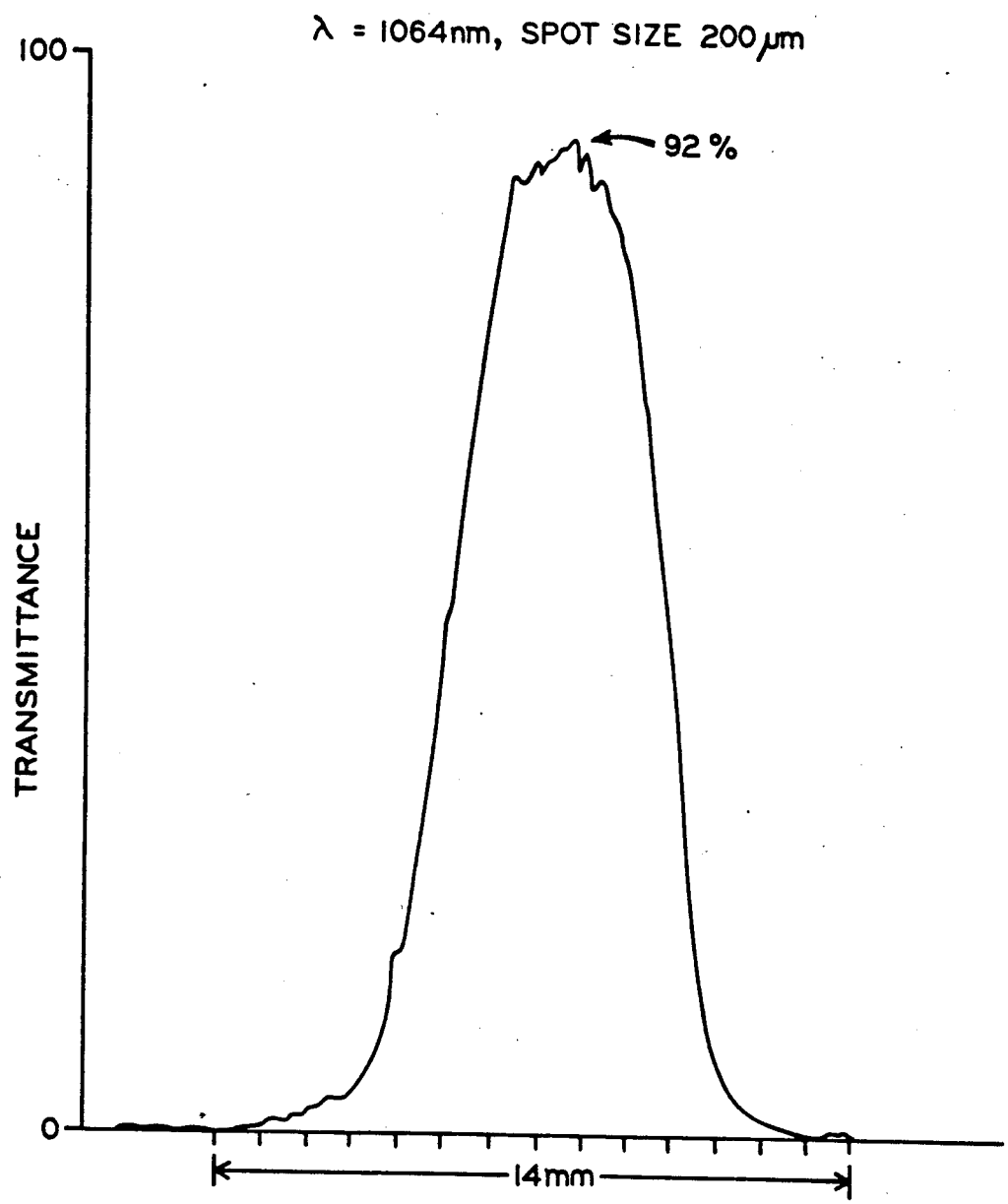
FIG. 8 is a curve illustrating the variation in transmittance across the aperture of the apodizer for an exemplary case where the aperture of the apodizer is 14 millimeters (mm) and the wavelength is 1064 nm.

In a soft aperture 10 of the type shown in FIG. 1 constructed using a 2000 mm biconvex lens, the spectral transmittance taken away from the center of the device (the optical axis), in an area where the thickness is greater than 15 micrometers, demonstrated a blocking extinction at 1064 nm wave length with an optical density (O.D.) of 2.5. FIG. 7 shows the optical density plot for this exemplary soft aperture device. The spatial transmittance profile of this device measured with an Nd: Yag laser (200 micrometer spot) is shown in FIG. 8. FIG. 8 is plotted using linearly polarized 1064 nm laser light with no analyzer ahead of a photodioded detector. It will be observed that transmittance falls from 100% (neglecting Fresnel losses) to 1% over a radial distance of about 7 mm.

Figure 2:
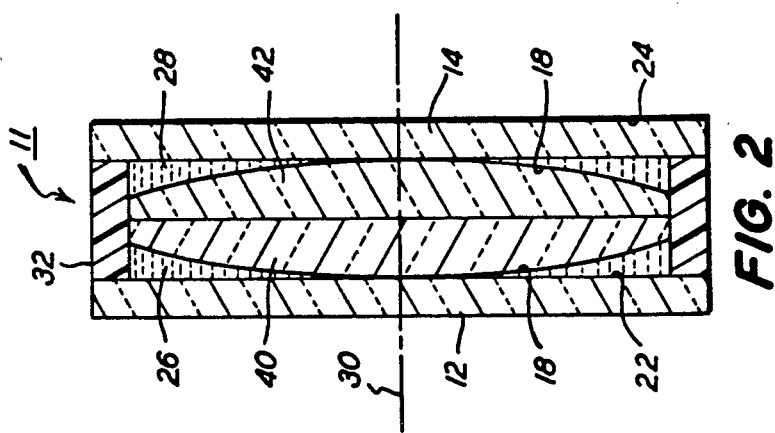
FIG. 2 is a view similar to FIG. 1 of soft aperture apparatus in accordance with another embodiment of the invention.

A soft aperture device 1 similar to the device 10 may be constructed using plano-convex lenses 40 and 42 with their planar surfaces in juxtaposition. See FIG. 2. Otherwise the construction is similar to that of the device shown in FIG. 1 and like parts are identified with like reference numerals. The spatial intensity profile of the beam may be altered in various parts of its cross section by changing the shape of the curved surfaces 18 and 20.

Figure 3:
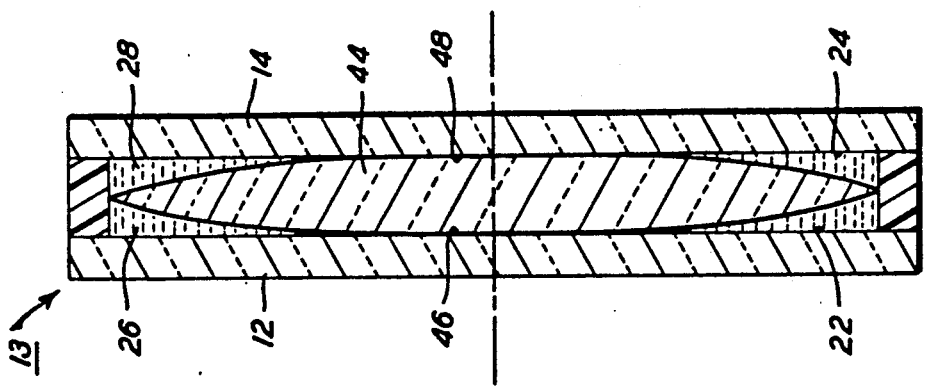
FIG. 3 is a view similar to FIG. 1 showing soft aperture apparatus in accordance with still another embodiment of the invention.

FIG. 3 shows a soft aperture device 13 using a biconvex lens 44 in which circular flats, for example from 6 to 9 mm radius are polished along areas about the optical axis 30 of the device. Otherwise the device 13 is similar to the device shown in FIG. 1 and like parts are indicated by like reference numerals. It will be observed that the flats 46 and 48 are in contact with the planar surfaces of the plates 12 and 14. Therefore the bodies 26 and 28 have substantially zero thickness over a circular area centered about the optical axis 30 of the lens 44.

Figure 10:
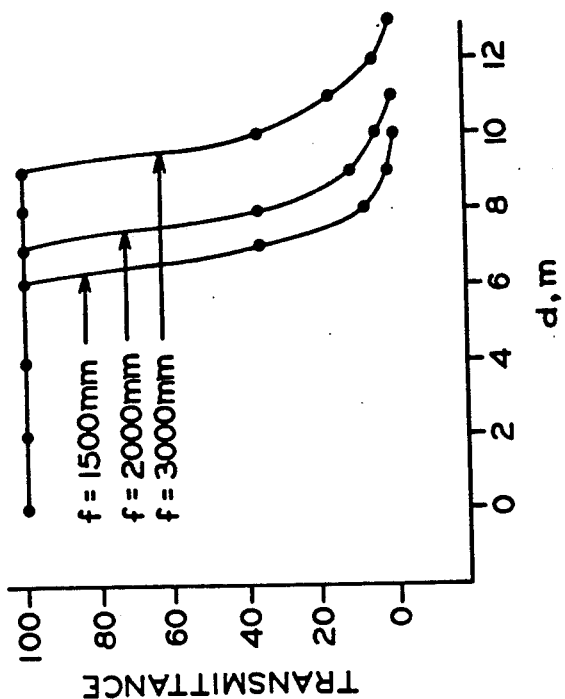
FIG. 10 is a family of curves similar to FIG. 6 for the embodiment of the apparatus illustrated in FIG. 3.
Figure 9:
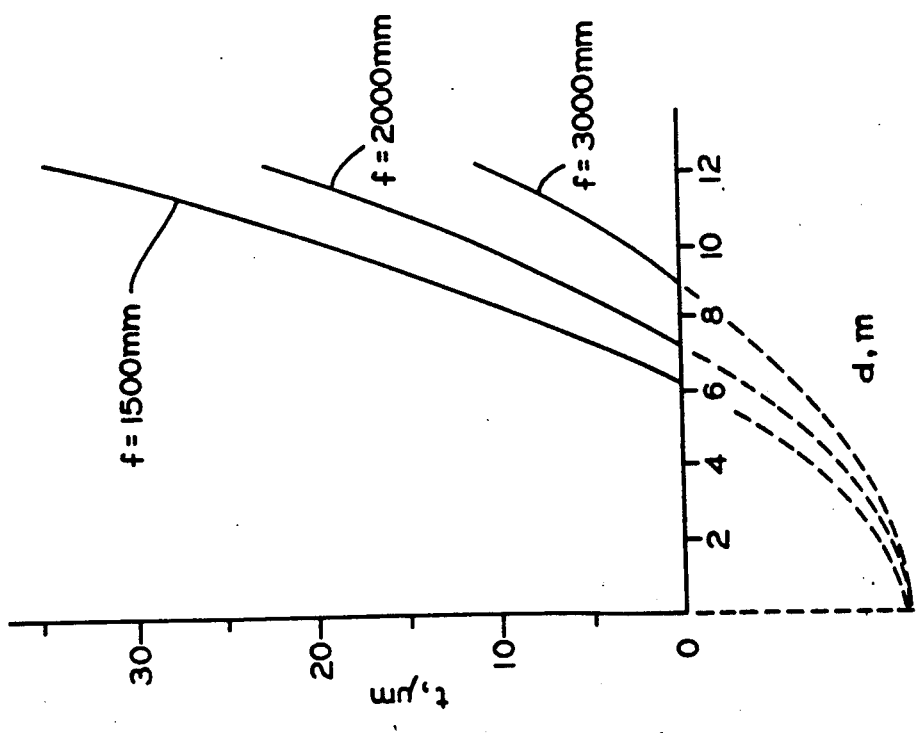
FIG. 9 is a graph similar to FIG. 5 for the embodiment of the apparatus illustrated in FIG. 3.

FIG. 9 shows the thickness profile of the bodies 26 and 28 used in the device shown in FIG. 3 for lenses having focal lengths of 1500, 2000 and 3000 mm. The transmittance profile of the device when using these different lenses is shown in FIG. 10. It is noted that the transmittance changes from 100% to less than 1% for the flattened 1500 mm and 2000 mm focal length lenses over a distance of approximately 3 mm. The flats effectively space the bodies 26 and 28 of liquid crystal cholesteric material radially outwardly away from the optical axis. By locating flats in different regions of the surfaces of the lens 44 the spatial profile of the beam may be tailored as desired.

Referring to FIG. 4 there is illustrated a system using an optical device 50 similar to that shown in FIG. 1 and an optical device 52 of construction similar to FIG. 3. These devices make use of liquid crystal cholesteric bodies which are tuned to different wavelengths $\lambda_1$ and $\lambda_2$ in the case of devices 50 and 52, respectively. The system is used to selectively shape (apodize) the intensity profile of colinear laser beams of wavelength $\lambda_1$ and $\lambda_2$ which are propagated along the same path. The center of the propagation path of these beams is along the optical axis 54 of the devices 50 and 52. The larger beam of diameter $D\lambda_1$ is apertured down (apodized) to a smaller beam diameter by the first device 50. Since the first device is tuned to $\lambda_1$ it does not effect the spatial intensity profile of the $\lambda_2$ beam. The $\lambda_2$ beam is apodized by the device 52 to a diameter $D'\lambda_2$ the second device 52 does not interact with the $\lambda_1$ beam since it is tuned to $\lambda_2$. Accordingly, the $\lambda_1$ beam remains apertured down to diameter $D'\lambda_1$ and both beams, selectively apodized, are emitted by the system shown in FIG. 4. Neither beam interferes or interacts with the other and the beams need not be spatially separated in order to be separately processed.

Referring to FIG. 11 there is shown an embodiment of the invention wherein the soft aperture dimension may be changed or tuned by the application of an applied electric field (A.C. voltages around or below 10 V from a source 60). The field is applied to transparent, conductive electrodes deposited on all surfaces 18-24 prior to PVA coating and rubbing. The selective reflection peak in the planar cholesteric structure can be shifted by changing the pitch of the liquid crystal helix with an electric field. Depending upon the sign of the dielectric anisotropy, $\Delta\epsilon$, of the fluid, pitch contraction ($\Delta\epsilon<0$) and pitch dilation $\Delta\epsilon>0$) have been reported (see F. Simoni and R. Bartolino, "Voltage Controlled Polarizer Using Cholesteric Liquid Crystals", Mol. Cryst. Liq. Cryst. 98, 243-246 (1983) and I. Fedak, R. D. Pringle and G. H. Curtis, "Electric Field Induced Changes in the Selective Reflection Band of Cholesteric Liquid Crystals", Mol. Cryst. Liq. Cryst. 64 (Letters), 69-79 (1980)). The occurrence of either effect will increase the dimensions of a soft aperture constructed as previously described. This opening up of the soft aperture occurs because the structure is forced out of agreement with equation (1). The tuning works to the point where the planar structure breaks down. This occurs at some voltage threshold (see F. Simoni, R. Bartolino and N. Scaramuzza, "Optical Properties of Cholesteric Liquid Crystals Under a DC Electric Field", in *Liquid Crystals of One- and Two-Dimensional Order*, Ed. W. Helfrich and G. Heppke, Springer-Verlag, New York, pp. 205-209 (1980).

From the forgoing description, it will be apparent that there has been provided improved optical apparatus using liquid crystals for shaping the spatial intensity of optical beams having designate wavelengths. While preferred embodiments of the apparatus have been described, variations and modifications thereof within the scope of the invention, will undoubtedly suggest themselves to those skilled in the art. For example the liquid crystal cholesteric materials which may be used in the herein illustrated devices may include those described in the referenced literature as well as those specifically mentioned herein. Accordingly, the foregoing description should be taken as illustrative and not in a limiting sense.

We claim:

1. Apparatus for shaping the profile of an optical beam of given wavelength which is directed along a path, which comprises first and second bodies of cholesteric liquid crystal material having opposite chirality about said path and disposed successively along said path, each of said bodies having a surface transverse to said path which is curved so that the thickness of each of said bodies along said path varies in the direction transverse to said path.

2. The apparatus according to claim 1 wherein said material of said body is in the liquid state at standard room temperature and atmospheric pressure.

3. The apparatus according to claim 1 further comprising a cell containing said bodies and a lens in said cell having surfaces which define said curved surfaces of said body.

4. The apparatus according to claim 3 wherein said cell has first and second chambers each with first and second surfaces transverse to the path of said beam, said second surfaces of said first and second chambers being defined by oppositely curved surfaces of said lens, and transparent substrates having planar surfaces, said planar surfaces defining the first surfaces of said chambers, said first body filling the fluid gap between said planar and curved surfaces of said first chamber and said second body filling the fluid gap between said planar and curved surfaces of said second chamber.

5. The apparatus according to claim 4 wherein said substrates are first and second plates of optically transparent material, and said lens is a spherical lens disposed between said first and said second plates and having its optical axis disposed along the path of said beam.

6. The apparatus according to claim 5 wherein the surfaces of said lens contacts at plates at the optical axis of said beam.

7. The apparatus according to claim 6 wherein said lens surfaces are planar along areas extending radially from said optical axis, said areas being in contact with said plates.

8. The apparatus according to claim 4 wherein said lens is a biconvex lens.

9. The apparatus according to claim 4 wherein said lens is a pair of plano-convex lenses with the planar surfaces thereof facing toward each other.

10. The apparatus according to claim 1 wherein a pair of optical beams of first and second wavelengths are transmitted colinearly with each other along said path, a first device having said first and second bodies of cholesteric liquid crystal material of opposite chirality with said curved surfaces transverse to said path and thicknesses variable in a direction transverse to said path; and a second device disposed in tandem with said first device along said path, said second device having third and fourth bodies of cholesteric liquid crystal material of opposite chirality with curved surfaces transverse to said path and thickness variable in a direction transverse to said path, the refractive index of said first and second bodies being different from the refractive index of said third and fourth bodies whereby said first device provides selective reflection of said first wavelength which varies across the aperture of one of said pair of beams without interfering with the other of said pair of beams and said second device provides selective reflection of said second wavelength which varies over the aperture of the other of said pair of beams without interfering with said one of said pair of beams.

11. The apparatus according to claim 10 wherein the bodies of one of said first and second devices are spaced at a different distance away from the center of the path of said beams than the bodies of the other of said first and second devices.

12. The apparatus according to claim 10 wherein said bodies are each defined by a pair of transparent plates and a lens disposed between said plates, the lens of one of said first and second devices having a different curvature from the lens of the other of said first and second devices.

13. The apparatus according to claim 12 wherein the lens of one of said first and second devices has planar surfaces in areas extending radially from the optical axis of said lens, said areas being in contact with said plates of said one device.

14. The apparatus according to claim 13 wherein said lenses of said first and second devices are convex lenses having spherically curved surfaces, the spherically curved surface of the lens of said one device extending from the planar surface areas thereof.

15. The apparatus according to claim 1 further comprising means for applying an A.C. field between the surfaces of said first body and the surfaces of said second body.

16. The apparatus according to claim 15 further comprising transparent electrodes which define said surfaces, and a source of A.C. voltage connected to said electrodes.

* * * * *